United States Patent
Blankert et al.

(10) Patent No.: US 10,391,453 B2
(45) Date of Patent: Aug. 27, 2019

(54) END CAP FILTRATION MODULE, FILTRATION MODULE AND FILTRATION SYSTEM

(71) Applicant: X-Flow B.V., Enschede (NL)

(72) Inventors: Bastiaan Blankert, Enschede (NL); Rob Borgerink, Albergen (NL)

(73) Assignee: X-Flow B.V., Enschede (NL)

( * ) Notice: Subject to any disclaimer, the term of this patent is extended or adjusted under 35 U.S.C. 154(b) by 239 days.

(21) Appl. No.: 15/028,747

(22) PCT Filed: Oct. 13, 2014

(86) PCT No.: PCT/NL2014/050710
§ 371 (c)(1),
(2) Date: Apr. 12, 2016

(87) PCT Pub. No.: WO2015/057059
PCT Pub. Date: Apr. 23, 2015

(65) Prior Publication Data
US 2016/0250598 A1    Sep. 1, 2016

(30) Foreign Application Priority Data
Oct. 15, 2013 (NL) ..................................... 2011614

(51) Int. Cl.
*B01D 63/00* (2006.01)
*B01D 61/18* (2006.01)
(Continued)

(52) U.S. Cl.
CPC ............. *B01D 63/00* (2013.01); *B01D 61/08* (2013.01); *B01D 61/18* (2013.01); *B01D 63/06* (2013.01);
(Continued)

(58) Field of Classification Search
CPC ........ B01D 63/00; B01D 63/06; B01D 63/10; B01D 63/02; B01D 61/18; B01D 61/08;
(Continued)

(56) References Cited

U.S. PATENT DOCUMENTS

| | | |
|---|---|---|
| 5,405,528 A | 4/1995 | Selbie et al. |
| 5,494,577 A | 2/1996 | Rekers |
| 2005/0045552 A1 | 3/2005 | Tadlock |

FOREIGN PATENT DOCUMENTS

| | | |
|---|---|---|
| DE | 102012202075 A1 | 8/2013 |
| EP | 1598105 A1 | 11/2005 |

(Continued)

*Primary Examiner* — Liam Royce
(74) *Attorney, Agent, or Firm* — Quarles & Brady LLP (57) ABSTRACT

An end cap for a filtration module having a chamber includes an outlet channel extending therethrough which is part of or forms an aerodynamically shaped element having a cross section with an elongated shape mainly directed from the inlet to the first outlet, a width of the elongated shape at both ends thereof being smaller than at a center part of the elongated shape. An end cap may also include an inlet, a first and second outlet, and a flow guide element arranged between the inlet and the first outlet within the chamber at a second outlet side thereof, the flow guide element extending a part of an inlet wall to a corresponding part of a first outlet wall, the flow guide element defining one or more openings allowing a portion of a main flow to flow towards the second outlet.

18 Claims, 7 Drawing Sheets

(51) Int. Cl.
*B01D 61/08* (2006.01)
*B01D 63/06* (2006.01)
*B01D 63/10* (2006.01)
*B01D 63/02* (2006.01)

(52) U.S. Cl.
CPC .............. *B01D 63/02* (2013.01); *B01D 63/10* (2013.01); *B01D 2313/08* (2013.01); *B01D 2313/105* (2013.01); *B01D 2313/125* (2013.01); *B01D 2313/13* (2013.01); *B01D 2313/21* (2013.01); *B01D 2313/44* (2013.01); *B01D 2313/54* (2013.01); *B01D 2317/04* (2013.01)

(58) Field of Classification Search
CPC ............ B01D 2313/44; B01D 2313/21; B01D 2313/13; B01D 2313/105; B01D 2313/08; B01D 2313/54; B01D 2313/125; B01D 2317/04
See application file for complete search history.

(56) References Cited

FOREIGN PATENT DOCUMENTS

| | | |
|---|---|---|
| WO | 2004/078326 A2 | 9/2004 |
| WO | 2012/105835 A1 | 8/2012 |

END CAP FILTRATION MODULE, FILTRATION MODULE AND FILTRATION SYSTEM

CROSS-REFERENCE TO RELATED APPLICATIONS

This application is the National Stage of International Application No. PCT/NL2014/050710 filed Oct. 13, 2014, which claims the benefit of Netherlands Application No. NL 2011614, filed Oct. 15, 2013, the contents of which is incorporated by reference herein.

FIELD OF THE INVENTION

The invention relates to an end cap for a filtration module, a filtration module provided with such an end cap, and a filtration system comprising said filtration module with end cap.

BACKGROUND OF THE INVENTION

Filtration modules may be used for the filtration of fluids and are known in a wide variety of variants. A filtration module usually comprises a housing with one or more filter elements, e.g. tubular membranes as shown in U.S. Pat. No. 5,494,577, positioned therein which divide the space inside the housing in a feeding side and permeate side.

One type of filtration module is based upon so-called dead-end filtration in which fluid to be filtered is fed to the feeding side, from there is passed through the filter element (s), wherein the solids are trapped in the filter and permeate (filtered fluid) is released at the permeate side.

As the filter elements get fouled over time, counter measures are required at least once in a while. A common countermeasure is to regularly provide a backwash flux through a filtration module to remove the solids from the filter and abduct the solids from the filtration module/filtration system. Backwashing is typically done by reversing flow directions of feed and permeate flows.

In typical high-volume industrial applications it is common to arrange multiple filtration modules in an array and connect them in a modular way to provide the required filtration capacity. To connect the filtration modules, use is made of so-called headers and/or end caps. The headers and end caps are configured to provide a flow path to the feeding side of each filtration module and to provide a flow path from the permeate side of each filtration module. An example of such a modular arrangement, wherein use is made of headers/end caps, is shown in U.S. Pat. No. 5,405,528.

When designing a filtration system with multiple filtration modules, there are two main design criteria that are preferably fulfilled. The first criterion is to minimize the size of the footprint of the filtration system. The second criterion is to minimize the standard deviation or variance of the performance of the multiple filtration modules. The first and second criteria may interfere with each other, so that a compromise needs to be sought.

The first criterion tries to maximize the number of filtration modules per unit of area, so that the maximum capacity can be obtained with the least occupied space.

The second criterion relates to the global settings of a filtration system. In order to protect the filtration modules from excessive fouling the global settings have to be based on the fouling rate of the worst performing modules. The worst performing modules are the modules with the highest filtration flux and/or the lowest backwash flux.

Therefore, it is desirable that each module performs as close to the average as possible, which means that a filtration system design should aim to minimize the pressure difference between the modules.

Traditional designs comprise a header with many side branches, wherein a filtration module is connected to a side branch via an end cap. In this design, the pressure difference between two filtration modules is determined only by the header. Depending on the number of filtration modules and the expected flow rate, the header size may be chosen to achieve an acceptable pressure gradient. Although the end caps cause hydraulic pressure losses, they do not contribute to the pressure difference between filtration modules, because the flow path through each filtration module comprises the same number of end caps. Hence, this design performs well in terms of the second criterion. However, from a first criterion point of view, the design can still be improved.

In an alternative design, with the aim to reduce the size of the footprint of the filtration system, the headers and the end caps are integrated as shown for instance in U.S. Pat. No. 5,405,528. Such a design may have advantages such as a smaller footprint and fewer parts/less material usage. However, in such a design the dimensions can not be adapted to the number of filtration modules or expected flow rates, especially not when the end caps are standardized in size. A disadvantage of the alternative design is thus that the friction in the end cap does contribute to the pressure difference between filtration modules, because the flow path for each filtration module comprises a different number of end caps.

SUMMARY OF THE INVENTION

Hence, an objective of the invention is to provide an end cap which allows a smaller footprint and which minimizes the pressure differences between filtration modules.

According to a first aspect of the invention, the objective is achieved by providing an end cap for a filtration module, said end cap defining a chamber and comprising: an inlet in fluid communication with the chamber, said inlet defining an inlet opening that is delimited by an inlet wall; a first outlet in fluid communication with the chamber, said first outlet defining a first outlet opening that is delimited by a first outlet wall; a second outlet in fluid communication with the chamber; and wherein the second outlet is configured to be connected to an inlet of the filtration module, wherein the end cap comprises a flow guide element arranged between the inlet and the first outlet within the chamber at a second outlet side of the chamber, said flow guide element extending a part of the inlet wall to a corresponding part of the first outlet wall to guide a main flow from the inlet to the first outlet, and wherein the flow guide element defines one or more openings allowing a portion of the main flow to flow towards the second outlet.

The end cap is configured to transport a main flow from the inlet to the first outlet, wherein a portion of the main flow flows towards an inlet of a filtration module via the second outlet. By providing a flow guide element between the inlet and the first outlet within the chamber at a second outlet side of the chamber to extend a part of the inlet wall to a corresponding part of the first outlet wall it is possible to smoothly guide the main flow from the inlet to the first outlet. As the flow guide element also defines one or more openings, a portion of the main flow is allowed to flow towards the second outlet.

In absence of the flow guide element, the main flow from the inlet to the first outlet will be distorted by the increase and subsequent decrease of the size of the chamber at the location of the second outlet, which increases friction and causes higher pressure loss. By providing the flow guide element within the chamber at a second outlet side of the chamber, the increase and decrease of the size of the chamber is reduced while still allowing a portion of the main flow to flow towards the second outlet via the one or more openings. Hence, the amount of distortion of the main flow is reduced by using the flow guide element and thus the pressure difference between filtration modules is reduced.

In an embodiment, the inlet opening and the first outlet opening are similar in shape and/or size. In this way the cross section of the inlet and the cross section of the first outlet are similar which minimizes the distortion and thus the pressure difference between inlet and first outlet. In case the cross section of the inlet and the cross section of the first outlet are substantially equal to each other, the flow guide element preferably has a constant cross section corresponding to a part of the cross section of the inlet and first outlet, so that the main flow is not or minimally disturbed by the flow guide element. In case the cross section of the inlet and the cross section of the first outlet are not equal to each other, the flow guide element preferably gradually changes its cross section from corresponding to a part of the cross section of the inlet at the inlet side of the flow guide element to corresponding to a part of the cross section of the first outlet at the first outlet side of the flow guide element, so that the distortion to the main flow is minimized.

In an embodiment, the inlet opening and/or the first outlet opening are circular shaped.

In an embodiment, the inlet opening and the first outlet opening are aligned with respect to each other. Not only does this minimize the pressure difference caused by the end cap, but it may also provide a smaller footprint compared to an end cap having a non-aligned inlet opening and first outlet opening.

Alignment of the inlet opening and the first outlet opening means that respective lines through the center of areas of the inlet opening and the first outlet opening that are directed parallel to a local flow direction defined by respectively the inlet wall and the first outlet wall coincide.

In an embodiment, the inlet wall and/or the first outlet wall are part of a tubular element having a constant cross section.

According to a second aspect of the invention, the objective is achieved by providing an end cap for a filtration module, said end cap defining a chamber and comprising: an inlet in fluid communication with the chamber; a first outlet in fluid communication with the chamber; a second outlet in fluid communication with the chamber; and an outlet channel extending through the chamber from within the second outlet to beyond an opposite side of the chamber, wherein the second outlet and the end of the outlet channel within the second outlet are configured to be connected to an inlet of the filtration module and an outlet of the filtration module, respectively, wherein the outlet channel is part of or forms an aerodynamically shaped element having a cross section in a plane perpendicular to a longitudinal axis of the outlet channel which cross section has an elongated shape mainly directed from the inlet to the first outlet, wherein a width of the elongated shape at both ends thereof is smaller than at a center part of the elongated shape.

The outlet channel which extends through the chamber forms a flow resistance negatively influencing the pressure difference between end caps. When the outlet channel is part of or forms an aerodynamically shaped element, the flow from inlet to first outlet is smoothly guided around the outlet channel which reduces the friction and thus the pressure difference between end caps.

The aerodynamically shaped element has a cross section in a plane perpendicular to a longitudinal axis of the outlet channel, which cross section has an elongated shape mainly directed from the inlet to the first outlet. The elongated shape has a width at both ends thereof which is smaller than a width at a enter part of the elongated shape.

It is specifically noted here that the use of the term aerodynamically shaped element does not limit the invention to applying the invention to gases only. The invention also applies to fluids and thus the aerodynamically shaped element may alternatively be referred to as a hydrodynamically shaped element. For convenience reasons only the term aerodynamically shaped element will be used in the remainder of this specification, but this term may thus where applicable be replaced by hydrodynamically shaped.

In an embodiment, the elongated shape is one of the following shapes: ellipse, oval, drop shape and wing shape.

In an embodiment, the elongated shape is an ellipse having a ratio between a length of the major axis of the ellipse and a length of minor axis of the ellipse of 3:1. In an embodiment, the ratio between a length of the major axis and a length of the minor axis of the ellipse is in the range of 2-4 to 1, more preferably in the range of 2.5-3.5 to 1.

In an embodiment, a longitudinal axis of the outlet channel is substantially perpendicular to a main flow guided by the end cap from the inlet to the first outlet.

In an embodiment, the chamber is wider where the aerodynamically shaped element is located.

The invention also relates to an embodiment combining the first and second aspect of the invention as described above.

The invention further relates to a filtration module provided with an end cap according to the first and/or the second aspect of the invention.

The invention also relates to a filtration system comprising multiple filtration modules according to the invention.

The invention also relates to a filtration method in which a filtration system according to the invention is used.

In an embodiment, the method comprises the step of regularly providing a backwash flux to the filtration modules in the filtration system.

BRIEF DESCRIPTION OF THE DRAWINGS

The invention according to the first and second aspects will now be described in a non-limiting way by reference to the accompanying drawings in which like parts are indicated by like reference symbols and in which.

DETAILED DESCRIPTION OF THE INVENTION

Figure 1:
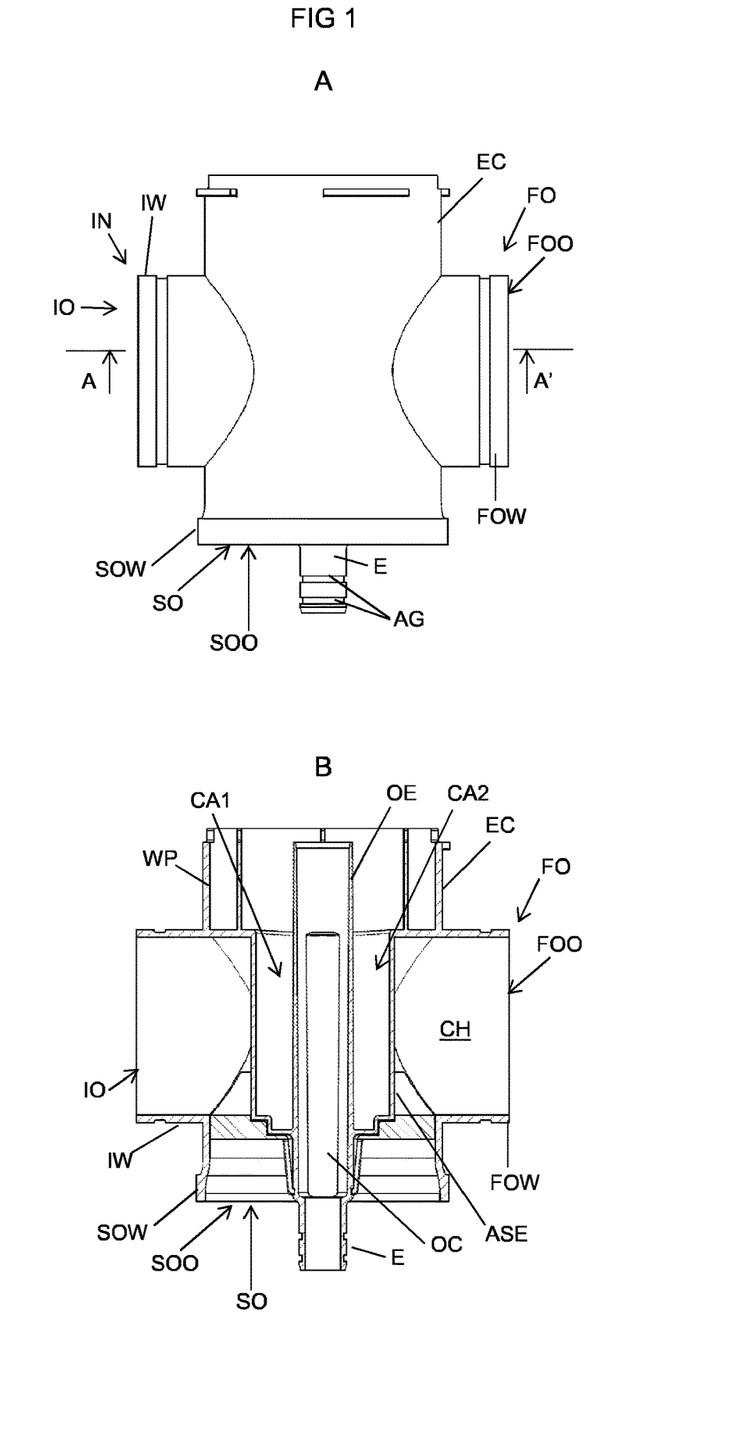
FIG. 1A depicts a side view of an end cap according to an embodiment of the invention.
FIG. 1B depicts a cross sectional side view of the end cap of FIG. 1A.
Figure 2:
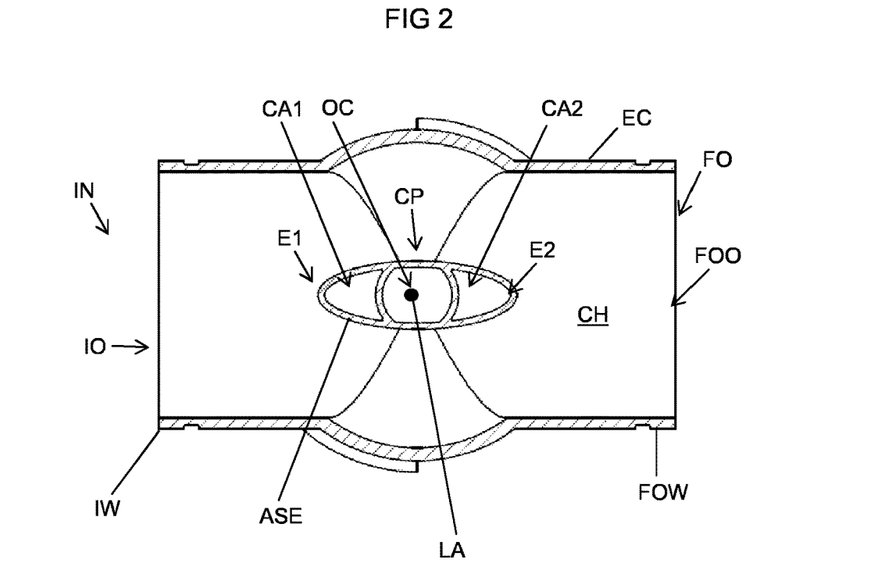
FIG. 2 depicts a cross sectional bottom view of the end cap of FIG. 1A.

FIG. 1A, 1B, 2, 3A, 3B, 4, 5A, 5B, 6, 7A and 7B depict an end cap EC according to an embodiment of the invention. FIG. 1A, 1B and 2 are used to highlight the second aspect of the invention. The remaining figures are used to highlight the first aspect of the invention. FIG. 1A, 1B and 2 thus omit the flow guide element characteristic for the first aspect of the invention in order to clearly explain the invention according to the second aspect.

FIG. 1A depicts a side view of the end cap, FIG. 1B depicts a cross sectional side view of the end cap and FIG. 2 depicts a cross sectional bottom view of the end cap along line A-A' as shown in FIG. 1A.

Figure 8:
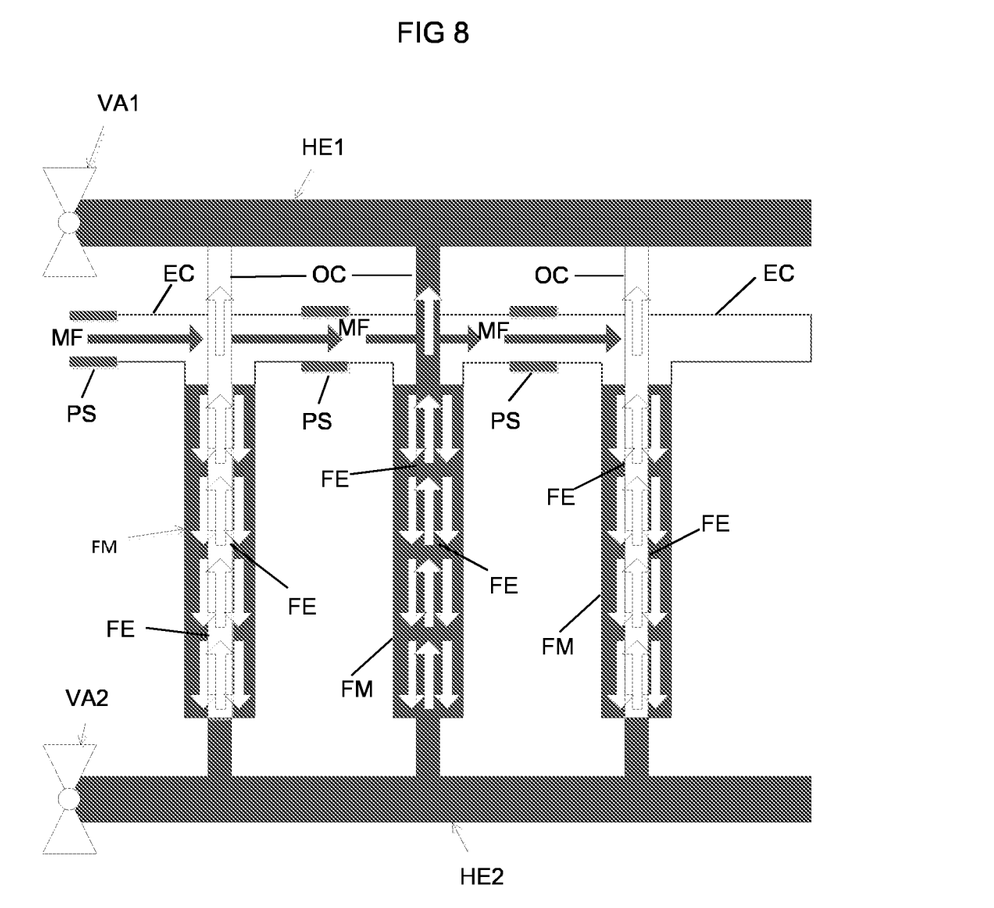
FIG. 8 depicts schematically a filtration system according to an embodiment of the invention.

The end cap EC is suitable to be used in combination with a filtration module FM as schematically shown in FIG. 8 which shows a part of a filtration system in cross section to show the interior of the filtration modules and the end caps and allows to explain the flow paths. The end cap EC is also suitable to be used in combination with a filtration module FM as schematically shown in FIG. 9 which shows in cross section a part of another filtration system.

Figure 9:
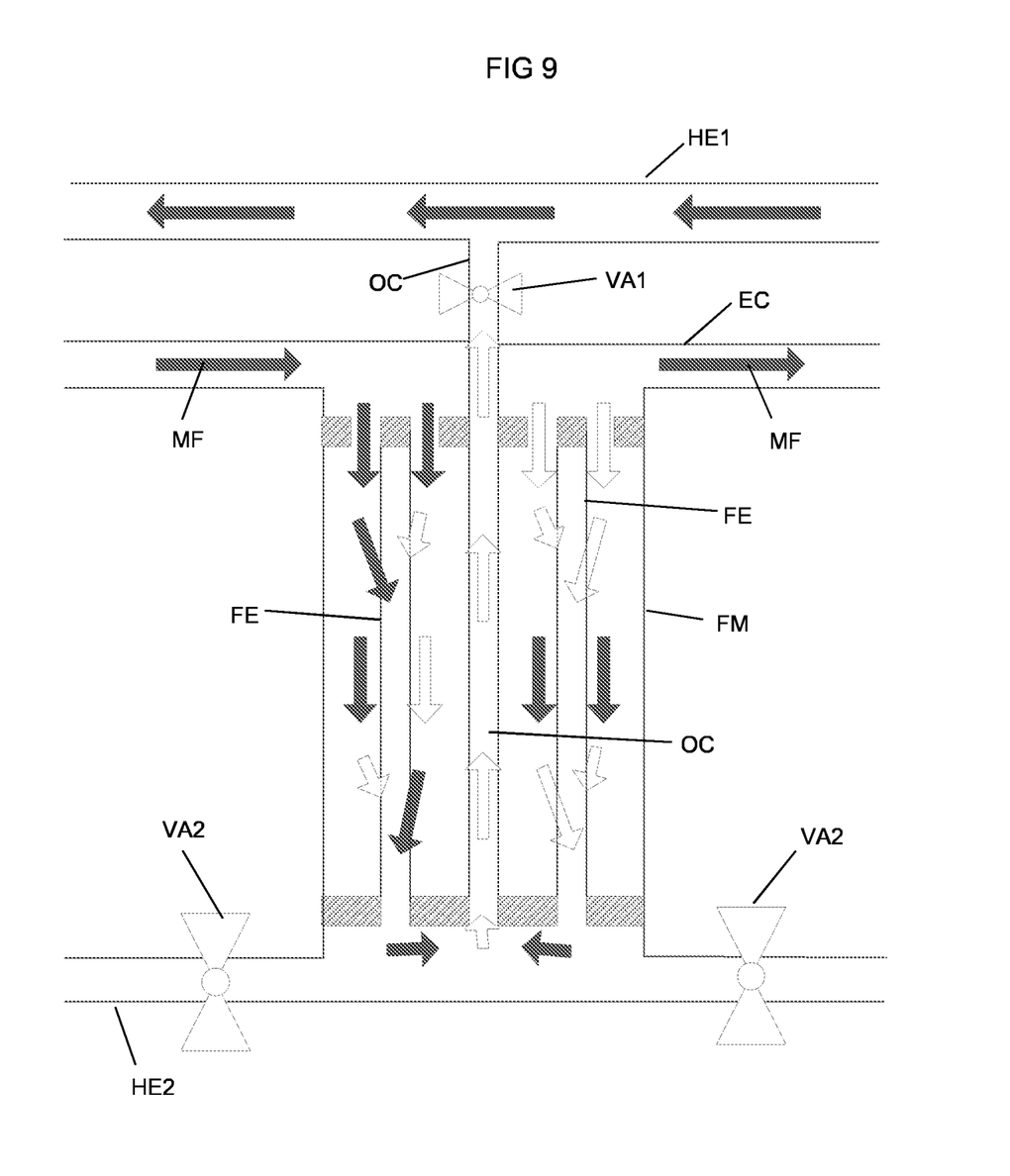
FIG. 9 depicts schematically a filtration system according to another embodiment of the invention.

The filtration systems of FIGS. 8 and 9 comprise multiple filtration modules FM which are connected to each other via respective end caps EC in a parallel configuration. FIG. 8 only shows three filtration modules and FIG. 9 only shows one filtration module, but in practice the number of filtration modules can be much higher.

Referring to FIG. 8, the end caps EC are connected together by pipe sections PS to function as a header to carry a main flow MF and to direct a portion thereof towards a respective filtration module FM. The filtration module comprises filter elements FE separating a feeding side of the filtration module from a permeate side of the filtration module. The end caps EC feed fluid from the main flow MF to the feeding side of the filtration module. The fluid then passes the filter elements to remove solids, e.g. particles, bacteria, viruses, etc., and is released at the permeate side of the filtration module. From the permeate side the fluid flows to a header HE1 via respective outlet channels OC which in this case extend through the end caps EC.

When operating the filtration system, the filter elements FE will fill with solids and get fouled. In order to clean the filter elements use may be made of a backwash flux. In this embodiment, the permeate sides of the filtration modules are therefore connected to a second header HE2 providing the backwash flux. When the backwash flux is applied, flow through the header HE1 is preferably blocked by closing a valve VA1 and the valve VA2 in header HE2 is opened to force a flow in opposite direction through the filter elements FE to remove the solids from the filter elements.

In an embodiment, the filter elements FE comprise membranes, e.g. tubular membranes which may be densely packed. In the configuration of the filtration modules of FIG. 8, the permeate side is arranged at a center of the filtration modules and at least partially surrounded by the feeding side. However, other configurations are also possible. For instance when use is made of multiple tubular membranes, the feeding side of a particular tubular membrane may be inside the tubular membrane and the permeate side may be outside the tubular membrane. It is possible that the tubular membranes are arranged in a circular manner surrounding a central space in the filtration modules such that fluid is fed to the internal spaces of the tubular members on the outside of the filtration module, forced through the tubular membranes and collected in the central space of the filtration module from the permeate sides of the tubular membranes to be transported out of the filtration module via the outlet channels OC.

Other configurations of the filtration modules, for instance in which the filter elements are hollow fibers, capillaries, flat or spiral wound packages also fall within the scope of the invention. In other words, the invention according to the first or second aspect is not limited to specific configurations of the filtration module.

When tubular membranes are used, such as capillaries, there exist two modes of operation, namely a so-called inside-out mode of operation in which fluid is fed to the inside of the tubular membranes and forced through the membranes to the outside of the tubular membranes, and a so-called outside-in mode of operation in which fluid is fed to the outside of the tubular membranes and forced through the membranes to the inside of the tubular membranes.

FIG. 9 depicts schematically an example of an outside-in mode of operation filtration system. The filtration system comprises an end cap EC for accommodating a main flow MF. A portion of the main flow MF is directed towards a filtration module FM.

The filtration module comprises filter elements FE in the form of tubular membranes or capillaries. The portion of the main flow directed toward the filtration module is fed to the outside of the tubular membranes, forced through the filter membranes to the inside of the tubular membranes as indicated by the arrows and collected at a lower portion of the filtration module to be transported via a centrally arranged outlet channel OC extending from the lower portion of the filtration module through the end cap EC to a first header HE1.

When the membranes of the filter elements FE get fouled, a backwash flux can be provided to flow in opposite direction, so in this case inside-out. To provide the backwash flux, a second header HE2 may be provided. The second header preferably comprises second valves VA2 which are closed during normal filtration operations and only opened when the backwash flux needs to be applied to the filtration module. A first valve VA1 is provided in the outlet channel OC, which first valve VA1 is open during normal filtration operations and only closed when the backwash flux needs to be applied to the filtration module.

It will be apparent to a person skilled in the art of filtration systems that other configurations and arrangements are also possible and still allow the application of the invention according to the first and/or second aspect of the invention.

Below a more detailed explanation of the end cap EC follows, wherein it is explicitly noted here that the application of the described end cap is not limited to the filtration systems of FIG. 8 or 9. The features of the exemplary end cap EC relating to the second aspect of the invention will be described first.

The end cap EC defines a chamber CH as can be seen in FIG. 1B and 2. The end cap comprises an inlet IN in fluid communication with the chamber CH, which inlet IN comprises an inlet opening IO that is delimited by an inlet wall IW. The end cap further comprises a first outlet FO in fluid communication with the chamber CH, which first outlet FO comprises a first outlet opening FOO that is delimited by a first outlet wall FOW. The end cap EC also comprises a second outlet SO in fluid communication with the chamber CH, which second outlet SO comprises a second outlet opening SOO that is delimited by a second outlet wall SOW. Hence, the general configuration of the end cap EC is a three-way connector having one inlet and two outlets.

The inlet and outlets refer to normal filtration operations. In case of a temporarily backwash flux, the inlet may form an outlet and the outlets may form inlets. Hence, the use of the terms inlet and outlet does not limit the possible directions of flow.

The second outlet SO is configured to be connected to an inlet of a filtration module (as for example shown in FIGS. 8 and 9). The filtration module comprises filter elements FE having a feeding side and a permeate side. The inlet of the filtration module allows fluid from the second outlet SO of the end cap EC to be fed to the feeding side of the filter elements and passed through the filter elements, so that filtered fluid is released at the permeate side.

In an embodiment according to the second aspect of the invention, the filtered fluid is collected at a central space of the filtration module and may leave the filtration module via the same end cap used to feed fluid to the feeding side of the filtration module. The end cap therefore comprises an outlet channel OC extending through the chamber CH from within the second outlet SO to beyond an opposite side of the chamber CH.

While the second outlet SO of the end cap is configured to be connected to an inlet of a filtration module, the end E of the outlet channel OC within the second outlet SO is configured to be connected to an outlet of the filtration module. The end E of the outlet channel therefore comprises two annual grooves AG (only shown in FIG. 1A) configured to receive a respective sealing ring to provide a sealing connection with the outlet of the filtration module. Other sealing arrangements, including a sealing arrangement with only one annular groove at the end E of the outlet channel OC, are also envisaged.

The inlet IN and first outlet FO are configured to function as a header carrying a main flow, wherein a portion of the main flow flows towards the second outlet SO to enter the filtration module. The inlet IN may therefore be connected to a first outlet of an adjacent similar end cap, and the first outlet FO may be connected to an inlet of an adjacent similar end cap. Connecting end caps together may include directly connecting an inlet IN of an end cap EC to a first outlet FO of an adjacent end cap EC, but may also involve an intermediate pipe section PS as shown in FIG. 8.

As shown with respect to this embodiment, the inlet opening IO and the first outlet opening FOO have a circular shape and are equal in size. The inlet opening IO and the first outlet opening FOO are further aligned with respect to each other, which means that lines through their respective center of areas and directed parallel to the local flow direction of the main flow coincide.

In this embodiment, the line through the respective center of area of the second outlet opening and directed parallel to the local flow direction of the flow through the second outlet is substantially perpendicular to the flow direction of the main flow through the chamber.

The end OE of the outlet channel OC opposite to the end E of the outlet channel OC within the second outlet SO may be connected to a header (as shown in FIGS. 8 and 9) collecting the permeate (filtered fluid) from the different filtration modules and transporting the permeate to another part of the filtration system. However, connecting the end OE of the outlet channel to a header is not necessarily per se, so that in other embodiments this end OE may also be connected to other components then a header.

In this embodiment, the end OE of the outlet channel OC is surrounded by a wall portion WP, which is effectively an extension of the cross section defined by the second outlet wall SOW. The space in between the wall portion WP and the end OE of the outlet channel therefor does not necessarily form part of any flow path through the filtration system. The space may for instance be the result of the chosen fabrication method and/or the wall portion WP may advantageously be used for connection purposes, e.g. to connect the end cap EC to a header HE1 as for example shown in FIGS. 8 and 9.

The outlet channel OC extends through the chamber CH from the second outlet SO to beyond the opposite side of the chamber CH and is in this embodiment right in the middle of the flow path of the main flow from inlet IN to first outlet FO. In order to reduce the pressure differences between filtration modules, the outlet channel OC in this embodiment forms part of an aerodynamically shaped element ASE having a cross section in a plane perpendicular to a longitudinal axis LA of the outlet channel OC as shown in FIG. 2, which cross section has an elongated shape mainly directed from the inlet IN to the first outlet FO, wherein a width of the elongated shape at both ends E1, E2 thereof is smaller than a width of a center part CP of the elongated shape. The aerodynamically shaped element ASE may alternatively be referred to as hydrodynamically shaped element when fluids are used.

In this particular embodiment, the elongated shape is an ellipse, preferably having a ratio between a length of the major axis of the ellipse and a length of the minor axis of the ellipse of 3:1. Alternative shapes, like an oval shape, drop shape and wing shape are also possible. An advantage of the ellipse shape is that the friction is independent of flow direction of the main flow, so that the first outlet FO can also function as inlet and the inlet IN can also function as first outlet FO. This makes it easier for a person to assemble the end caps as the risk of making an error is made smaller.

As is shown clearly in FIG. 2, the end cap of this embodiment is rotation symmetric about the longitudinal axis LA of the outlet channel OC. The end cap EC is in this case also substantially symmetric about a plane through the longitudinal axis of the outlet channel OC, wherein said plane is normal to the flow direction of the main flow from inlet to first outlet.

As can be clearly seen in FIG. 2, the aerodynamically shaped element ASE comprises the outlet channel OC in the central part CP and two cavities CA1, CA2 extending parallel to the outlet channel OC on either side thereby forming the ends E1, E2 of the elongated shape. The ends E1, E2 of the elongated shape do not have to be hollow necessarily, but by making them hollow, the required amount of material and thus the weight of the end cap is reduced.

In an alternative embodiment, the cavities CA1, CA2 are part of the outlet channel, so that the entire aerodynamically shaped element ASE is configured to guide a flow from the filtration module to for instance a header.

FIG. 1B shows that in this embodiment, the cross section of the outlet channel does not have an elongated shape over the entire length of the outlet channel, only the part of the outlet channel that substantially extends in the main flow from inlet to first outlet has a cross section with an elongated shape, because there the contribution to the reduction of friction is the highest.

In the shown embodiment, the outer diameter of the second outlet opening is larger than the diameter of the inlet opening and first outlet opening. This may advantageously be used to compensate for the presence of the outlet channel within the second outlet, so that the size of cross sectional area of the second outlet opening available for fluid transportation is similar or equal to the size of the cross sectional area of the inlet opening and the first outlet opening. By extending the second outlet wall to the opposite side of the chamber without changing the size of the cross section, the chamber CH is wider at its center in between the inlet IN and the first outlet as can be clearly seen in FIG. 2. This compensates for the presence of the aerodynamically shaped element, so that the size of the cross sectional area as seen by the main flow from inlet to first outlet is hardly changed seen in width direction, i.e. looking in flow direction. The aerodynamically shaped element in this embodiment only divides the main flow in two sub flow paths around the aerodynamically shaped element.

In an embodiment, the aerodynamically shaped element ASE or part thereof, is fabricated separately and assembled in the end cap EC. Hence, in an embodiment, the outlet channel OC carrying the permeate flow is integrally formed with the end cap and a separately fabricated element is positioned over the outlet channel OC to form the aerodynamically shaped element. This allows to adapt current end caps lacking such an aerodynamically shaped element and/or allows more design freedom. An advantage of integrally forming the aerodynamically shaped element is that less assembly steps are required.

FIG. 3A, 3B, 4, 5A, 5B, 6, 7A and 7B depict the end cap EC of FIGS. 1A, 1B and 2, but also depict a flow guide element FG being part of the end cap EC and being relevant to explain the invention according to the first aspect of the invention.

Figure 3:
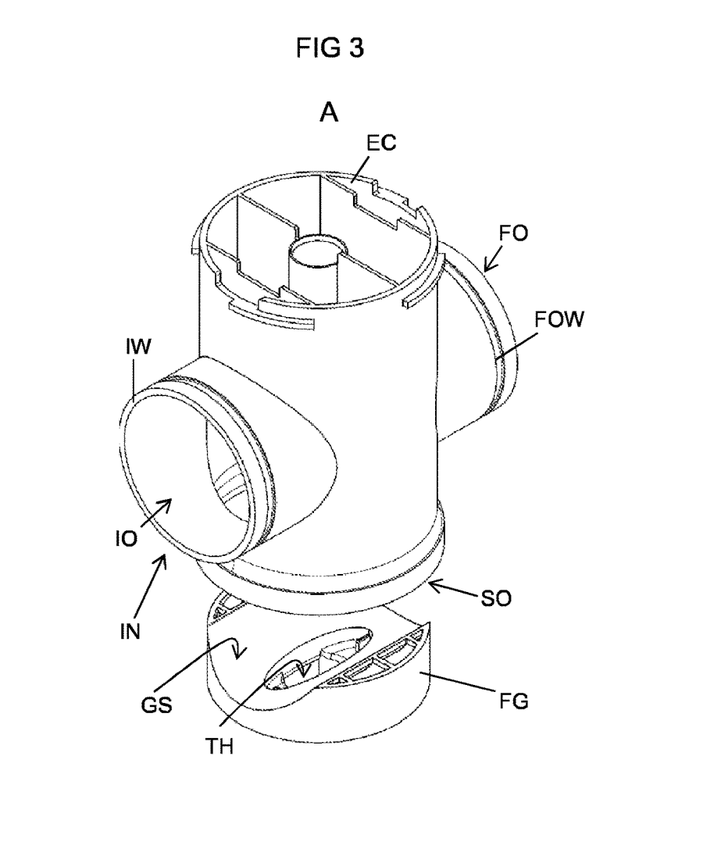
FIG. 3A depicts an exploded perspective view of the end cap of FIG. 1A and an aerodynamically shaped element according to the second aspect of the invention.
FIG. 3B depicts a cross sectional exploded perspective view of the end cap and aerodynamically shaped element of FIG. 3A.
Figure 4:
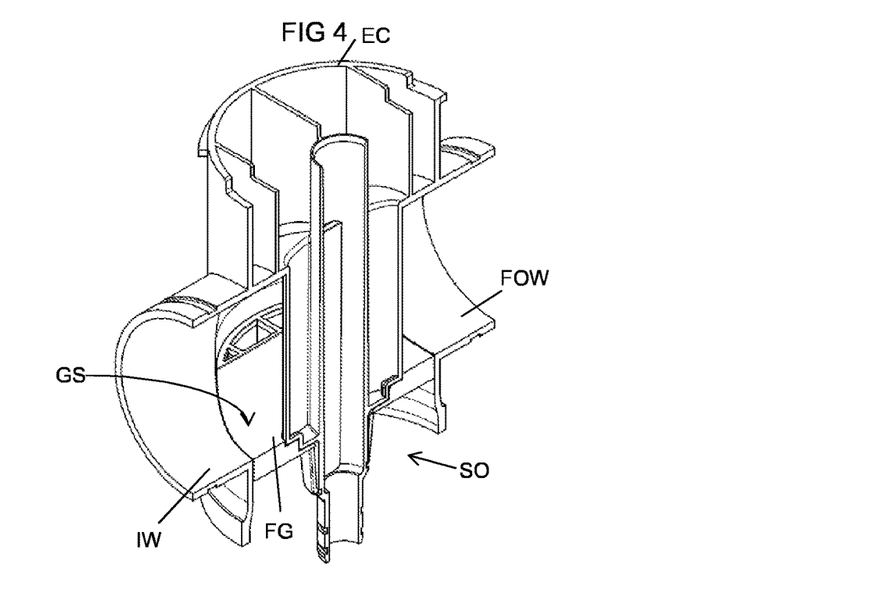
FIG. 4 depicts a cross sectional perspective view of the end cap and aerodynamically shaped element of FIG. 3A in assembled state.
Figure 5:
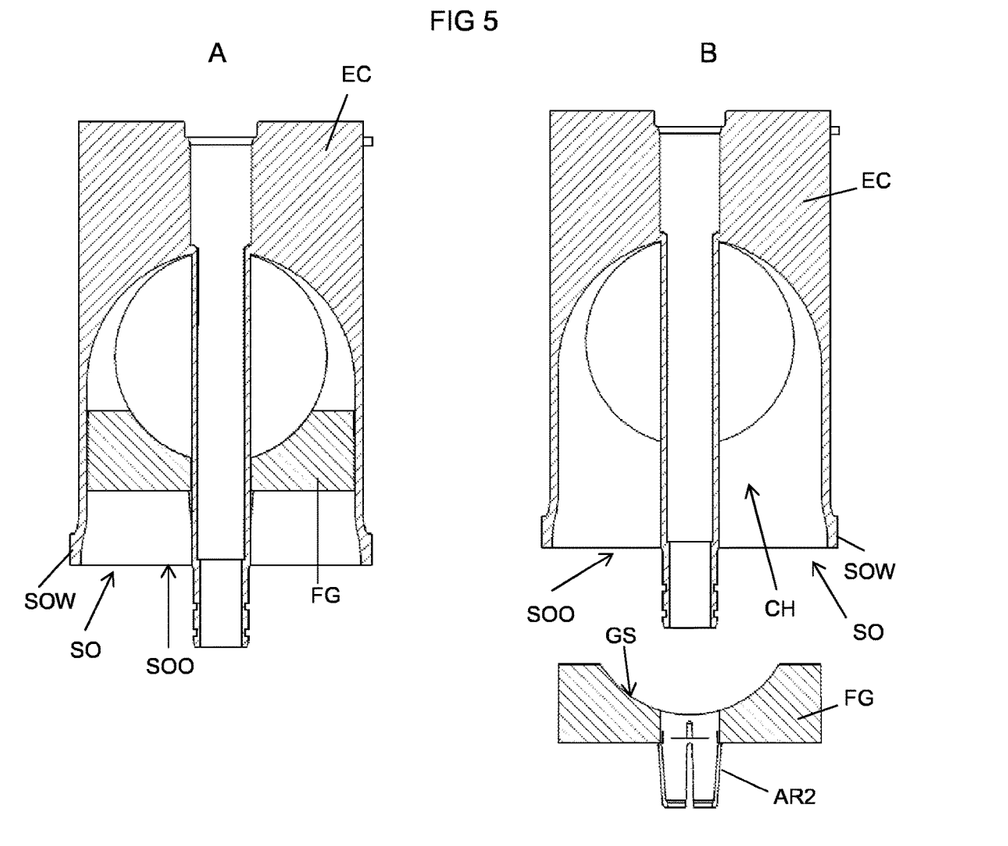
FIG. 5A depicts a cross sectional front view of the end cap and aerodynamically shaped element of FIG. 4.
FIG. 5B depicts a cross sectional exploded front view of the end cap and aerodynamically shaped element of FIG. 3A.
Figure 6:
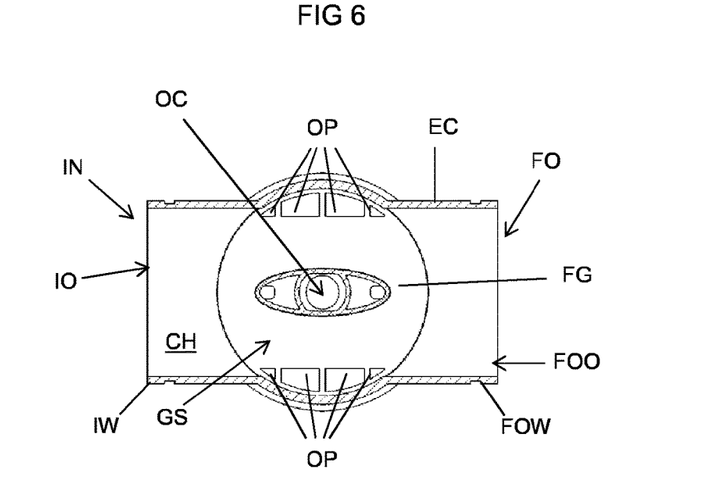
FIG. 6 depicts a cross sectional top view of the end cap and aerodynamically shaped element of FIG. 4.
Figure 7:
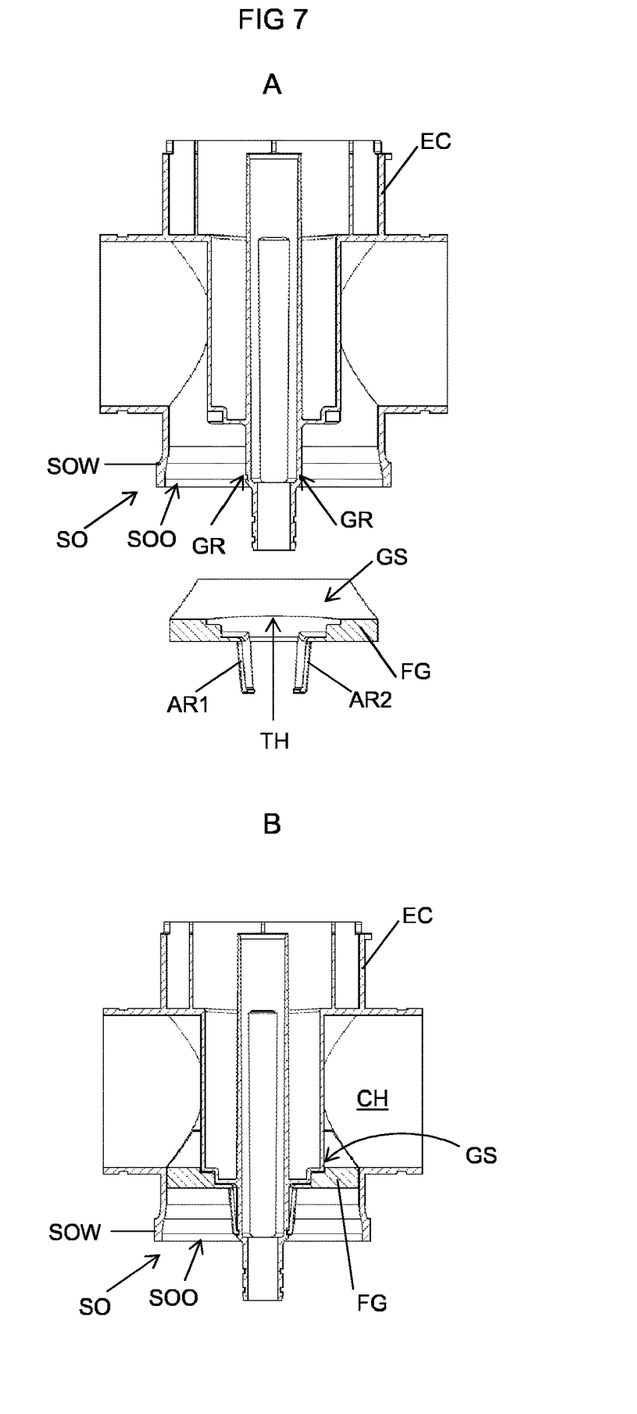
FIG. 7A depicts a cross sectional exploded side view of the end cap and aerodynamically shaped element of FIG. 3A.
FIG. 7B depicts a cross sectional side view of the end cap and aerodynamically shaped element of FIG. 4.

FIG. 3A depicts an exploded perspective view, FIG. 3B depicts a cross sectional exploded perspective view, FIG. 4 depicts a cross sectional perspective view, FIG. 5A depicts a cross sectional front view, FIG. 5B depicts a cross sectional exploded front view, FIG. 6 depicts a cross sectional top view, FIG. 7A depicts a cross sectional exploded side view, and FIG. 7B depicts a cross sectional side view.

In this particular embodiment, the flow guide element FG is an element that is separately fabricated from the main part of the end cap EC. Hence, the flow guide element FG and the main part of the end cap EC first need to be assembled to form the final end cap according to the first aspect of the invention. The end cap in assembled state is shown in FIG. 4, 5A, 6 and 7B. The FIG. 3A, 3B, 5B and 7A depict the end cap in exploded view or unassembled state.

In an alternative embodiment, the flow guide element may also be fabricated integral with the end cap EC, so that assembly is not required. However, the fabrication process in combination with the integral flow guide element may limit the design freedom. Using a separately fabricated flow guide element, more design freedom is introduced, as for instance more shapes are possible using an injection molding fabrication process compared to an integrally formed flow guide element. Other fabrication methods are also possible, for instance integrally forming the flow guide element with the aerodynamically shaped element and assembling the two components as a single element in the end cap.

Assembly of the end cap EC and flow guide element FG is performed in this embodiment by introducing the flow guide element into the chamber via the second outlet SO.

In the assembled state the flow guide element FG is arranged in between the inlet IN and the first outlet FO within the chamber CH at a second outlet side of the chamber, such that the flow guide element extends a part of the inlet wall IW to a corresponding part of the first outlet wall FOW to guide a main flow from the inlet IN to the first outlet FO.

In other words, the flow guide element comprises a guiding surface GS extending between the inlet and the first outlet which continues a part of the cross section of the inlet to a corresponding part of the cross section of the first outlet. As the cross section of the inlet in this embodiment is equal to the cross section of the first outlet, the guiding surface has a similar cross sectional shape from inlet to first outlet. In case the cross section of the inlet differs in shape and/or size from the cross section of the first outlet, the cross section of the guiding surface preferably gradually changes from corresponding to a part of the cross section of the inlet to corresponding to a respective part of the cross section of the first outlet to smoothly guide the main flow from inlet to first outlet.

The position of the flow guide element FG in the end cap EC is in this embodiment fixed by clamping the flow guide element around the end E of the outlet channel OC within the second outlet. The flow guide element therefore comprises two arms AR1, AR2, the free ends of which can be received in a corresponding groove GR of the end E of the outlet channel. As the end E of the outlet channel OC already comprises annular grooves AG and in order to avoid confusion during assembly, the grooves GR are provided in a portion of the end E of the outlet channel OC which has a larger outer diameter than the portion of the end E comprising the annular grooves AG. As a result thereof, the free ends of the arms AR1, AR2 cannot engage in the annular grooves, so that during assembly it is clear when the flow guide element is correctly inserted into second outlet opening SOO.

The flow guide element FG is further provided with multiple openings OP (see FIG. 6) allowing fluid to flow from the main flow towards the second outlet to enter the filtration module. The flow guide element FG further comprises a through hole TH configured to receive the end E of the outer channel OC and the lower portion of the aerodynamically shaped element ASE. The internal shape of the through hole preferably matches the outer shape of the end E of the outer channel and/or the lower portion of the aerodynamically shaped element ASE.

The flow guide element defines one or more openings for allowing fluid to flow from the main flow towards the second outlet. The one or more openings may be provided in the flow guide element itself as in the shown embodiment, but the one or more openings may also be provided by cooperation between the flow guide element and the surrounding walls of the chamber or the aerodynamically shaped element.

In this embodiment, the one or more openings are provided at or near an outer wall of the end cap in the middle part where the width is larger than the width at the inlet and the first outlet. However, the one or more openings may also be provided at other locations, such as in front of the aerodynamically shaped element.

The invention claimed is:

1. An end cap for a filtration module, said end cap defining a chamber and comprising:
    an inlet in fluid communication with the chamber, said inlet defining an inlet opening that is delimited by an inlet wall;
    a first outlet in fluid communication with the chamber, said first outlet defining a first outlet opening that is delimited by a first outlet wall;
    a second outlet in fluid communication with the chamber; and
    wherein the second outlet is configured to be connected to an inlet of the filtration module,
    an outlet channel extending through the chamber from within the second outlet to beyond an opposite side of the chamber,
    wherein an end of the outlet channel within the second outlet is configured to be connected to an outlet of the filtration module;
    wherein the end cap comprises a flow guide element arranged between the inlet and the first outlet within the chamber at a second outlet side of the chamber, said flow guide element forming a guiding surface that extends a part of the inlet wall to a corresponding part of the first outlet wall to guide a main flow from the inlet to the first outlet,
    wherein the flow glide element further comprises a through hole configured to receive the outlet channel and wherein the flow guide element is configured to be mounted to at least a portion of the outlet channel, and
    wherein the flow guide element defines one or more openings allowing a portion of the main flow to flow towards the second outlet.

2. The end cap according to claim 1, wherein the inlet opening and the first outlet opening are substantially similar in shape.

3. The end cap according to claim 1, wherein the inlet opening and the first outlet opening are equal in size.

4. The end cap according to claim 1, wherein the inlet opening and/or the first outlet opening are circular shaped.

5. The end cap according to claim 1, wherein the inlet opening and the first outlet opening are aligned with respect to each other.

6. The end cap according to claim 1, wherein the inlet wall and/or the first outlet wall are part of a tubular element having a constant cross section.

7. The end cap according to claim 1, wherein the flow guide element is separately fabricated from the end cap.

8. A filtration module provided with an end cap according to claim 1.

9. A filtration system comprising multiple filtration modules according to claim 8.

10. The end cap according to claim 1, wherein the outlet channel extends through the flow guide element from within the second outlet to beyond the opposite side of the chamber to divide the main flow from the inlet into two flow paths directed around the outlet channel and to the first outlet.

11. The end cap according to claim 10, wherein the outlet channel extends through the middle of the chamber.

12. The end cap according to claim 1, wherein the flow guide element further includes arms that extend from the flow guide element, the arms configured to engage a groove in the end of the outlet channel to secure the flow guide element to the outlet channel.

13. The end cap according to claim 1, wherein the flow guide element defines a plurality of openings that are positioned on the periphery of the flow guide element and adjacent walls of the chamber.

14. The end cap according to claim 1, wherein the end cap is substantially symmetric about a plane through a longitudinal axis of the outlet channel, wherein the plane is normal to the main flow from the inlet to the first outlet.

15. The end cap according to claim 14, wherein a longitudinal axis of the outlet channel is perpendicular to the main flow guided by the end cap from the inlet to the first outlet.

16. The end cap according to claim 1, wherein an outer diameter of the second outlet opening is larger than the diameter of the inlet opening and first outlet opening.

17. The end cap according to claim 1, wherein the second outlet of the end cap is connected to an inlet of the filtration module, the filtration module comprising:
    filter elements arranged in the filtration module to form a feed side and a permeate side, wherein the filtration module is configure to guide the main flow from the inlet to the feed side, where the main flow is passed through the filter elements to form a permeate on the permeate side; and
    wherein the permeate side is in fluid communication with the outlet channel of the end cap.

18. The end cap according to claim 17, wherein the end of the outlet channel includes at least one annual groove configured to receive a sealing ring to form a sealing connection with the permeate side of the filtration module.

* * * * *